Patented Dec. 28, 1948

2,457,603

UNITED STATES PATENT OFFICE 2,457,603

POLYVINYL BORONATES AND METHODS FOR PRODUCING SAME

Paul L. Salzberg and Frank K. Signaigo, Brandywine Hundred, Del., assignors to E. I. du Pont de Nemours & Company, Wilmington, Del., a corporation of Delaware No Drawing. Application March 28, 1945, Serial No. 585,396

9 Claims. (Cl. 260—85)

This invention relates to new chemical products and processes for obtaining them, and more particularly to the manufacture of new polyvinyl esters of boronic acids.

Polyvinyl alcohol has become an important industrial polymer and because of its high strength and other properties has found numerous important uses. Due to the solubility characteristics and particularly the water sensitivity of polyvinyl alcohol it is, however, unsuitable for some important applications.

Accordingly, this invention has as an object to increase the usefulness of polyvinyl alcohol by modifying its properties. Another object is to provide a new class of vinyl polymers. A further object is to provide processes for obtaining a new and useful class of polymeric materials. Other objects will appear hereinafter.

These objects are accomplished in accordance with the present invention by bringing a vinyl polymer containing hydroxyl groups into contact with a member of the class consisting of boronic acids, boronic acid halides, boronic acid anhydrides, and lower alkyl esters of boronic acids until the desired degree of reaction has occurred. The polyvinyl esters of boronic acids thus obtained are novel and important products.

It has been discovered that when a vinyl polymer containing hydroxyl groups such as polyvinyl alcohol is treated with a boronic acid or one of its hydrolyzable derivatives it is converted to the corresponding polyvinyl boronic ester. Depending upon the degree of esterification desired, upon the form of the hydroxyl containing vinyl polymer employed, and upon the particular boronic acid derivative used, the process may be accomplished in a variety of ways, as shown in the following examples. Generally, however, when boronic acids are employed, aqueous solutions of the vinyl polymer containing hydroxyl groups and the boronic acid are simply mixed, and the polyvinyl boronate which precipitates is isolated by filtration. Alternatively, if a polyvinyl boronate is desired in film or fiber form, the vinyl polymer containing hydroxyl groups may be treated in film or fiber form with an aqueous solution of the boronic acid, esterification readily taking place, especially with mild warming to yield the polyvinyl boronate as a film or fiber. When a halogen derivative of a boronic acid such as an alkyl or aryl boron dichloride is used, the hydroxylated vinyl polymer in powder form is brought into contact with the organoboron dihalide dissolved in a solvent for the product such as chloroform.

The boronic acid derivatives used in the practice of this invention are obtainable readily by known methods. The chlorovinylboron dichloride and chlorovinylboronic acid are obtained as described in the copending applications of H. R. Arnold, Serial Nos. 585,394 and 585,395, filed of even date herewith (now U. S. Patent Nos. 2,402,-539 and 2,402,500, respectively. Benzeneboron dichloride is obtainable by the catalyzed reaction of benzene with boron trichloride (Pace. Atti Lincei (6), 10, 193 (1929)). A general method for obtaining aryl boron dihalides is by the reaction of mercury aryls with boron trihalides (Die Chemie der metallorganischen Verbindungen, 205 (1937)). The aryl boronic acids are obtained by hydrolysis of the corresponding dihalides. Both alkyl and aryl boronic acids are obtainable by the reaction of Grignard reagents on boric esters or boron trifluoride. Boronic acids have the general formula $RB(OH)_2$, in which R stands for any organic radical joined to the boron atom through a carbon atom.

The products of this invention are a new class of vinyl polymers which vary in their properties depending upon the particular boronic acid employed. Generally they are characterized by being soluble in certain organic solvents, insoluble in water, high melting and capable of being plasticized or formed into strong films or fibers having superior water resistance to polyvinyl alcohol.

The following examples illustrate but do not limit the practice of this invention. Parts are given by weight.

Example I

Polyvinyl chlorovinylboronate is prepared in the following manner: Twenty-two parts of granular high viscosity polyvinyl alcohol is added to a stirred solution of 36 parts of chlorovinylboron dichloride dissolved in 600 parts of chloroform. Reaction proceeds rapidly as is evidenced by the evolution of hydrogen chloride and the solution of the polyvinyl alcohol. The mixture is warmed to 35° C., and after about 2 hours the polyvinyl alcohol has dissolved to form a thick gel-like solution. The viscosity of this solution can be greatly decreased by the addition of 4 parts of methanol. The residual dissolved hydrogen chloride is removed by distilling from the reaction mixture a portion of the chloroform at reduced pressure. The clear colorless solution is then cast onto a glass plate and the chloroform allowed to evaporate. The resulting film is stripped from the plate and further dried at 105° C. for 2 hours.

The formation of this new film-forming polymer, polyvinyl chlorovinylboronate may be represented by the following equation:

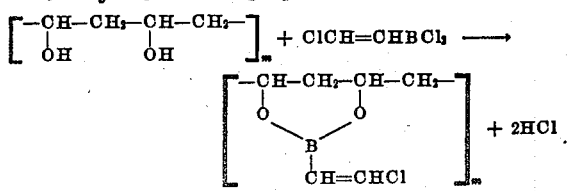

Analysis indicates that most of the hydroxyl groups in the polyvinyl alcohol are esterified by the boronic acid. A typical sample contained 6.4% of boron and 22.0% of chlorine. This product has a tensile strength of 10,000 lb./sq. in. and be oriented by drawing at 70–120° C. to still further increase its strength. It has very much greater resistance to attack by water than polyvinyl alcohol and does not swell in water.

*Example II*

Polyvinyl benzeneboronate is obtained in the following manner: Seventeen parts of high viscosity polyvinyl alcohol dissolved in 1200 parts of water is heated to about 50° C. and stirred while a warm solution of 20 parts of benzeneboronic acid dissolved in 1000 parts of water is added rapidly. A white granular precipitate forms which is filtered, washed with water and dried. The yield is 26 parts or 92% of theory. The granular polyvinyl benzeneboronate may be made into useful dispersions or dissolved for casting into films. It is readily soluble in dioxane and to a lesser extent in hot benzene. Films of polyvinyl benzeneboronate are exceedingly tough.

Polyvinyl chlorovinylboronate can be prepared in an analogous manner by mixing aqueous solutions of polyvinyl alcohol and chlorovinylboronic acid. At the same degree of esterification its properties are essentially the same as those of the product of Example I.

*Example III*

Polyvinyl alcohol in film or fiber form can be readily esterified with boronic acids so as to obtain the polyvinyl ester directly. This is accomplished conveniently by soaking polyvinyl alcohol film in an aqueous solution of the boronic acid. For example, a polyvinyl alcohol film was treated for 3 hours with a saturated solution of chlorovinylboronic acid at 50° C. and then dried at 100° C. for about 5 minutes. The resulting film contained 1.4% of boron and 4.2% of chlorine. It was markedly more resistant to swelling and dissolution in water than the untreated polyvinyl alcohol film.

In an analogous manner polyvinyl alcohol film is converted to polyvinyl ethaneboronate by soaking the film for 4 hours in a saturated aqueous solution of ethaneboronic acid. The resulting film is clear, strong and water resistant. Likewise, polyvinyl alcohol film soaked in a saturated solution of benzeneboronic acid at 50° C. for 3 hours and subsequently dried is converted to an opaque, stiff and exceedingly tough and strong product which has greatly improved water resistance over the starting material.

*Example IV*

Eighty-eight parts of powdered low viscosity polyvinyl alcohol is heated at 90° C. in a solution of 134 parts of dimethyl chlorovinylboronate in 500 parts of dioxane. Methanol distills out of the reaction mixture and after 2 to 3 hours the polyvinyl alcohol has reacted and dissolved. The viscous solution can be used as an adhesive.

*Example V*

A film of 50% hydrolyzed polyvinyl acetate is soaked in a saturated aqueous solution of chlorovinylboronic acid for 2 hours. It is then removed from the solution and dried at 100° C. The clear strong film of polyvinyl acetate chlorovinylboronate is much less swollen by water than the original film.

The foregoing examples have illustrated in detail several aspects of this invention. It is to be understood, however, that the invention is not limited to these particular embodiments. The vinyl polymers containing hydroxyl groups that may be used in the practice of this invention include not only polyvinyl alcohol but also partially hydrolyzed polyvinyl esters such as polyvinyl acetate alcohol, polyvinyl acetate stearate alcohol, partially hydrolyzed polyvinyl acetals, as for example, polyvinyl formal alcohol, polyvinyl acetal alcohol and polyvinyl butyral alcohol. It will be readily understood that unless these partially hydrolyzed polyvinyl derivatives contain a substantial proportion of hydroxyl groups, the extent of conversion to the polyvinyl boronate will be limited, but for certain applications these mixed polyvinyl acetate boronates and polyvinyl acetal boronates are useful. Completely or partially hydrolyzed interpolymers of vinyl acetate and ethylene are also useful starting materials for the invention.

Certain polyvinyl boronates have been described in the foregoing examples but all polyvinyl boronates are considered to come within the scope of this invention. Other members that may be mentioned include polyvinyl methaneboronate, butaneboronate, dodecaneboronate, octadecaneboronate, tolueneboronate, naphthaleneboronate, chlorobenzeneboronate, hydroxybenzeneboronate, aminobenzeneboronate and the like.

The extent of esterification may be varied depending upon the particular properties desired. When it is desired to modify the surface of a polyvinyl alcohol film so as to decrease its water sensitivity without changing appreciably its other properties, then it is only necessary to subject the polyvinyl alcohol to a mild treatment with the boronic acid. On the other hand, when it is desired to obtain a product of maximum water resistance and high solubility in organic solvents then a high degree of esterification is indicated. It will be readily apparent that the extent of esterification can be controlled by the proportion of reactants employed, the time of treatment, and the concentration of the esterifying reagent.

The process generally can be carried out at room temperature but higher temperatures may be employed and are frequently advantageous to accelerate the rate of reaction, to increase the solubility of the boronic acid in the treating solution, and to drive out byproducts to aid in completing the esterification. When esterifying the polyvinyl alcohol starting material in film or fiber form, it is desirable to employ a solution of the boronic acid in a solvent that will swell the film or fiber. Generally such a solvent will be water, a lower aliphatic alcohol or a mixture of water and an alcohol.

The particular boronic acid derivative employed can be varied as already described and will depend upon such considerations as its availability and the particular solvent system in which it is desired to operate. Especially useful for converting granular polyvinyl alcohol and organoboron dihalides, and these are best used in chloroform, benzene, or similar solvents. Esters or anhydrides of boronic acids are useful for converting polyvinyl alcohol and partially hydrolyzed polyvinyl esters and acetals and are used in solution in alcohols or dioxane. Boronic acids may also be employed in water, alcohol or other suitable solvents.

The polyvinyl boronates of this invention constitute a new class of vinyl polymers having a number of uses. They may be obtained as strong pliable films or fibers and may be oriented to develop still higher strengths. As dispersions these materials have applications in the field of adhesives and emulsifying agents. Another feature of the invention is that it provides a simple means of modifying the properties of preformed polyvinyl alcohol articles.

As many apparently widely different embodiments of this invention may be made without departing from the spirit and scope thereof, it is to be understood that we do not limit ourselves to the specific embodiments thereof except as defined in the appended claims.

We claim:

1. A polyvinyl ester of an organo-boronic acid having the general formula $RB(OH)_2$, in which R is an organic radical joined to the boron atom through a carbon atom and is a member selected from the group consisting of an aliphatic hydrocarbon, an aromatic hydrocarbon, and the halogen, hydroxyl, and amino-substituted derivatives of said aliphatic and aromatic hydrocarbons.

2. A polyvinyl ester of ethaneboronic acid.

3. A polyvinyl ester of chlorovinylboronic acid.

4. A polyvinyl ester of benzeneboronic acid.

5. A process of making a polyvinyl ester of a boronic acid having the general formula $RB(OH)_2$, in which R is an organic radical joined to the boron atom through a carbon atom and is a member selected from the group consisting of an aliphatic hydrocarbon, an aromatic hydrocarbon, and the halogen, hydroxyl, and amino-substituted derivatives of said aliphatic and aromatic hydrocarbons which comprises contacting a vinyl polymer containing alcoholic hydroxyl groups with a member of the group consisting of boronic acids, boronic acid halides, boronic acid anhydrides, and alkyl esters of boronic acids.

6. A process of making a polyvinyl ester of a boronic acid having the general formula $RB(OH)_2$, in which R is an organic radical joined to the boron atom through a carbon atom and is a member selected from the group consisting of an aliphatic hydrocarbon, an aromatic hydrocarbon, and the halogen, hydroxyl, and amino-substituted derivatives of said aliphatic and aromatic hydrocarbons which comprises contacting a vinyl polymer containing alcoholic hydroxyl groups with an organoboron dihalide.

7. A process of making polyvinyl chlorovinylboronate which comprises adding polyvinyl alcohol to a solution of chlorovinylboron dischloride.

8. A process of making a polyvinyl ester of a boronic acid which comprises contacting a vinyl polymer containing alcoholic hydroxyl groups with a boronic acid having the general formula $RB(OH)_2$, in which R is an organic radical joined to the boron atom through a carbon atom and is a member selected from the group consisting of an aliphatic hydrocarbon, an aromatic hydrocarbon, and the halogen, hydroxyl, and amino-substituted derivatives of said aliphatic and aromatic hydrocarbons.

9. A process of making a polyvinyl ester of a boronic acid which comprises contacting a vinyl polymer containing alcoholic hydroxyl groups with an alkyl ester of a boronic acid having the general formula $RB(OH)_2$, in which R is an organic radical joined to the boron atom through a carbon atom and is a member selected from the group consisting of an aliphatic hydrocarbon, an aromatic hydrocarbon, and the halogen, hydroxyl, and amino-substituted derivatives of said aliphatic and aromatic hydrocarbons.

PAUL L. SALZBERG.
FRANK K. SIGNAIGO.

REFERENCES CITED

The following references are of record in the file of this patent:

UNITED STATES PATENTS

| Number | Name | Date |
|---|---|---|
| 2,326,539 | Irany | Aug. 10, 1943 |

OTHER REFERENCES

Jones, article in "British Plastics," February 1944, pages 77–83.